United States Patent [19]

Winsel

[11] 4,390,447
[45] Jun. 28, 1983

[54] MANUFACTURING PROCESS FOR NICKEL (II) HYDROXIDE

[75] Inventor: August Winsel, Kelkheim, Fed. Rep. of Germany

[73] Assignee: Varta Batterie Aktiengesellschaft, Hanover, Fed. Rep. of Germany

[21] Appl. No.: 285,031

[22] Filed: Jul. 20, 1981

[30] Foreign Application Priority Data

Aug. 7, 1980 [DE] Fed. Rep. of Germany ....... 3029898

[51] Int. Cl.³ .............................................. H01M 4/32
[52] U.S. Cl. .................................. 252/182.1; 429/223
[58] Field of Search ....................... 252/182.1; 429/223

[56] References Cited

U.S. PATENT DOCUMENTS

| | | | |
|---|---|---|---|
| 3,684,441 | 8/1972 | Faber | 429/223 |
| 3,752,706 | 8/1973 | Melin | 252/182.1 |
| 3,899,350 | 8/1975 | Jackovitz et al. | 252/182.1 |
| 3,941,614 | 3/1976 | Jackovitz et al. | 252/182.1 |
| 4,016,091 | 4/1977 | Jackovitz et al. | 252/182.1 |
| 4,064,332 | 12/1977 | Elfwing et al. | 252/182.1 |
| 4,172,909 | 10/1979 | Winsel | 429/223 |
| 4,206,271 | 6/1980 | Norling | 252/182.1 |

*Primary Examiner*—Irwin Gluck
*Attorney, Agent, or Firm*—Weiser, Stapler & Spivak

[57] ABSTRACT

A manufacturing process for nickel (II) hydroxide suitable as active positive electrode material in alkaline electrochemical cells transforms solid $Ni(NO_3)_2$ directly into $Ni(OH)_2$ using sodium hydroxide and with the least possible homogeneous solute phase of $Ni^{2+}$ ions. $Ni(NO_3)_2$ is deposited on the lower end of a diagonally upward moving conveyor belt, to which concentrated NaOH is supplied from the opposite direction. The depressions in the conveyor belt, which prevent downward sliding of the reaction product, discharge at the upper end $Ni(OH)_2$, together with easily separable $NaNO_3$. At the lower end, the used NaOH is discharged. It can be reconcentrated, after separation of entrained $NaNO_3$, in a vacuum evaporator and reused. The intermediate products of the process are basic nickel nitrates, for example of the composition $Ni(NO_3)_2 \times Ni(OH)_2 \times 6H_2O$.

8 Claims, 1 Drawing Figure

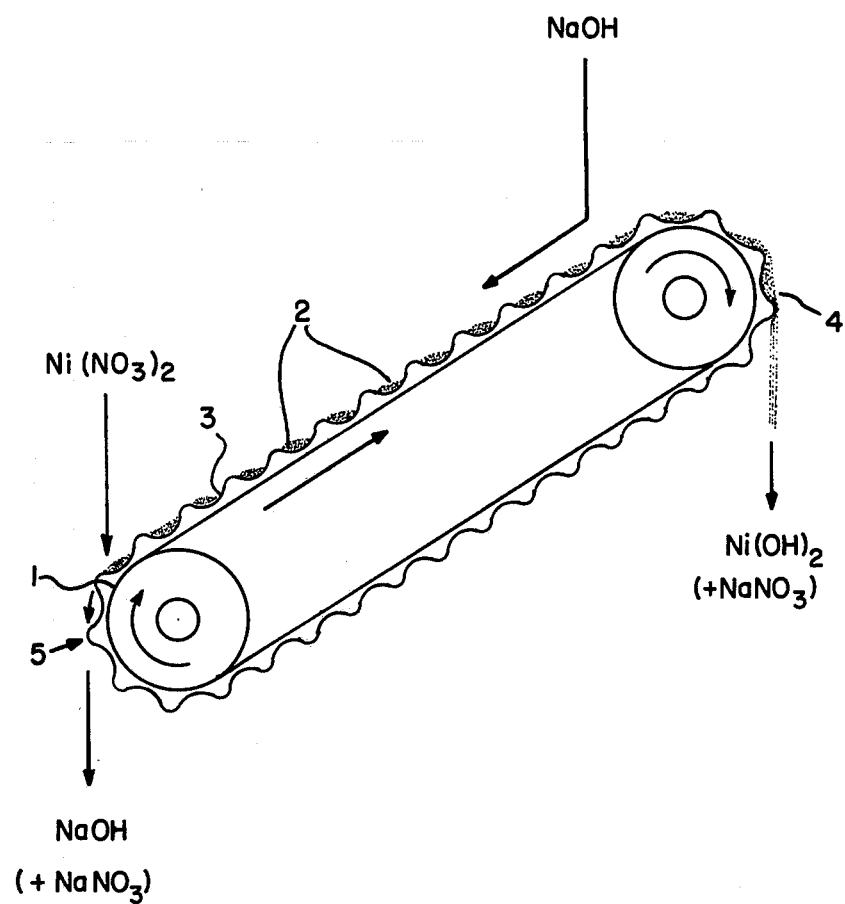

MANUFACTURING PROCESS FOR NICKEL (II) HYDROXIDE

The invention relates to a process for manufacturing nickel hydroxide as the active component of the positive electrode mass for alkaline electrochemical cells, through reaction between a nickel(II) salt and an alkali hydroxide.

Currently $Ni(OH)_2$ for use as the positive mass in alkaline cells is manufactured by means of a tedious precipitation process. This involves precipitating the hydroxide from nickel(II) salt solutions by means of alkali hydroxides, separating the precipitate from the mother liquor, washing and drying. Because of the poor filterability of the precipitate, which initially is present in suspended form, this process takes long, sometimes several days.

In contrast, the incorporation of the active mass into the highly porous frame of sinter electrodes, which also entails a precipitation process, can be accomplished quickly. In so doing, the sinter plate is immersed in a highly concentrated nickel nitrate solution in order to fill its pores with same. Thereafter the saturated plate is treated with concentrated alkali hydroxide to precipitate the nickel hydroxide and is subsequently washed and dried. The complete process leads in less than one hour to the incorporated mass with high yield.

Accordingly it is an object of the invention to provide a process which makes possible an efficient production of $Ni(OH)_2$ from water soluble nickel salts without the encumbrance of large quantities of liquid and without the separation of the reaction product through a time consuming filtration which is otherwise required.

This and other objects which will appear are achieved in accordance with the invention by transforming the powdery nickel(II) salt directly into $Ni(OH)_2$, using highly concentrated hydroxide, while suppressing a homogeneous solute phase of $Ni^{2+}$ ions.

It is particularly desirable to accomplish the transformation using nickel nitrate and sodium hydroxide.

It is a characteristic of the invention that the $Ni(OH)_2$ particle is produced in nearly topo-chemical reaction, that is, with the solute phase largely suppressed. In this particle, the information of the nickel nitrate particle is preserved, in the sense that it resembles the nickel nitrate particle in its morphology and size.

Such a transformation is made possible by bringing the reactants together not directly but in counter-current. By bringing the pure nickel nitrate powder in contact primarily with less concentrated hydroxide, there does not take place immediately complete transformation into $Ni(OH)_2$. Rather there are formed interim basic nickel nitrates, for example of the composition $Ni(NO_3)_2 \times Ni(OH)_2 \times 6H_2O$. With increasing $Ni(OH)_2$ content in the molecule, the water solubility of the basic nickel nitrate decreases. In addition, a substantial quantity is bound to the hydroxide liquid as water of crystallization, the transformation at the reaction site is limited, and the creation of a suspension is largely precluded.

When the basic nickel nitrates thereafter come in contact with unused, highly concentrated hydroxide, that is with a hydroxide having low water content, the complete transformation into $Ni(OH)_2$ is consummated.

In essence the transformation must therefore take place in such manner that nickel nitrate powder is displaced along a transport path, while highly concentrated hydroxide moves in the direction opposite to the flow of the powder. Thereby, the hydroxide concentration decreases as a result of reaction with the powder and, at the point of introduction of the fresh nickel nitrate, only a moderately concentrated hydroxide is present. The quantity of transported hydroxide is to be kept small enough so that the reaction mixture becomes thoroughly wetted but does not give rise to a suspension. Moreover the hydroxide must, at the end of its movement, not be so enriched in $OH^-$ ions as to cause dissolution of fresh $Ni(NO_3)_2$ before separation of basic nitrates or of $Ni(OH)_2$, in other words the transformation of the $Ni(NO_3)_2$ must take place in situ.

The overall transformation process need not necessarily proceed continuously. A procedure using several discrete steps can also be envisioned. The term "in countercurrent" therefore refers merely to the direction in which the reaction components nickel salt and alkali hydroxide are displaced relative to each other.

For further details, reference is made to the discussion which follows in light of the accompanying drawing, wherein the single FIGURE illustrates a practical means for carrying out the process embodying the invention.

A dosing device (not shown) is used to deposit $Ni(NO_3)_2$ powder upon the lower end of the diagonally upward extending conveyor belt 1. Sodium hydroxide flows counter to the upwardly moving powder, being supplied at the upper end of the conveyor belt. Along its downwardly directed path, the hydroxide comes in contact with oppositely moving basic nickel nitrate 2, in which there is an increase in the fraction of $Ni(NO_3)_2$ which has not yet been transformed into $Ni(OH)_2$. There results an enrichment of the hydroxide in $OH^-$ ions. For example, the fresh sodium hydroxide at the upper point of discharge of the conveyor belt may be 11 normal, while being only 2 normal at the lower end.

To prevent the $Ni(NO_3)_2$ from sliding off the conveyor belt and also to ensure a predetermined dwell time with the hydroxide, tub-shaped recesses 3 are provided in the conveyor belt transversely to its direction of movement. As a result the hydroxide flows in cascade-like manner over the rims of the recesses toward the bottom. At each step a further exchange takes place between the hydroxide and the content of the recesses. Thus the basic character of the nickel nitrate increases in each recess from the bottom to the top, until pure $Ni(OH)_2$ is discharged by tilting of the conveyor belt at its turnover point 4.

The hydroxide which drips down at 5 can be supplied to a vacuum evacuator after removal of entrained alkali nitrate. After reconcentration it can be reintroduced into the process. Washing out of the nitrate from the $Ni(OH)_2$, which is discharged at point 4, presents no difficulty because of its coarse crystalline configuration, which contrasts with the voluminous, flocked product of conventional precipitation.

Because $Ni(OH)_2$ is not inherently conductive, it may be desirable in some cases to transform the active mass entirely or partially into higher valued nickel oxides by means of a chemical oxidant such as potassium peroxidisulfate. In this manner there are obtained electrodes which have a predetermined electron conductivity and are pre-formed for assembly.

It is particularly advantageous to include in the process of the invention a partial oxidation of the $Ni(OH)_2$ by means of $K_2S_2O_8$. This is accomplished by transforming the powdery nickel nitrate, not with pure sodium hydroxide, but with a mixture thereof and of potassium peroxi-disulfate.

I claim:

1. A process for manufacturing nickel hydroxide for use as the active component of the positive electrode mass in alkaline electrochemical cells through reaction between a water soluble nickel(II) salt and alkali hydroxide, wherein the nickel(II) salt in powder form is reacted directly into $Ni(OH)_2$ with highly concentrated hydroxide, while suppressing a homogeneous solute phase of the $Ni^{2+}$ ions.

2. The process of claim wherein the powdery nickel-(II) salt is $Ni(NO_3)_2$.

3. The process of claim 1 wherein the hydroxide is NaOH.

4. The process of claim 1 wherein the hydroxide also includes a chemical oxidation medium.

5. The process of claim 4 wherein the oxidation medium is potassium peroxi-disulfate.

6. The process of claim 1 wherein the reactants are caused to contact each other in counter-current manner.

7. The process of claim 6 wherein the salt is transported from the lower to the upper end of a diagonally upwardly moving conveyor belt, while the hydroxide is transported in counter-current downwardly on the same conveyor belt.

8. The process of claim 7 wherein the conveyor belt has transverse recesses for preventing the powdery salt from sliding off the conveyor belt during transport.

* * * * *